United States Patent [19]

Abu-Shumays et al.

[11] Patent Number: 4,987,315
[45] Date of Patent: Jan. 22, 1991

[54] HINGE MOUNTED AND SLIDABLE SUN VISORS

[76] Inventors: Ibrahim K. Abu-Shumays; Mary D. Abu-Shumays, both of 1248 Varner Rd., both of Pittsburgh, Pa. 15227

[21] Appl. No.: 509,191

[22] Filed: Apr. 16, 1990

Related U.S. Application Data

[63] Continuation-in-part of Ser. No. 451,937, Dec. 18, 1989, which is a continuation-in-part of Ser. No. 387,784, Aug. 1, 1989, Pat. No. 4,919,468, which is a continuation-in-part of Ser. No. 158,846, Feb. 22, 1988, abandoned.

[51] Int. Cl.$^5$ ............................................... B60J 3/02
[52] U.S. Cl. .................................. 296/97.11; 296/97.4
[58] Field of Search .................. 296/97.4, 97.11, 97.9, 296/97.12, 97.13

[56] References Cited

U.S. PATENT DOCUMENTS

| | | | |
|---|---|---|---|
| 1,409,340 | 3/1922 | Hanna | 296/97.11 |
| 1,958,962 | 5/1934 | Crosby | 296/97.11 |
| 2,013,560 | 9/1935 | Hacker | 296/97.4 |
| 2,100,427 | 11/1937 | Blocker | 296/97.4 X |
| 2,122,120 | 6/1938 | Thode | 296/97.4 |
| 2,235,421 | 3/1941 | Devine | 296/97.11 |

FOREIGN PATENT DOCUMENTS

| | | | |
|---|---|---|---|
| 1053397 | 2/1954 | France | 296/97.11 |
| 322344 | 12/1929 | United Kingdom | 296/97.11 |

*Primary Examiner*—Margaret A. Focarino
*Assistant Examiner*—Joseph D. Pape

[57] ABSTRACT

This invention introduces sun visors each restricted to cover a side window, or cover a windshield of an automobile. Each visor is mounted to a top part of an automobile by a single hinge and can rotate between a top stored position and a lowered used position. Each visor has a visor plate along one of its sides mounted to a plate of the hinge in such a way as to make it easy to slide the visor in a horizontal direction whenever it is desirable to do so.

1 Claim, 1 Drawing Sheet

HINGE MOUNTED AND SLIDABLE SUN VISORS

This is a continuation-in-part of Application Ser. No. 451,937, filed Dec. 18, 1989, which is a continuation-in-part of Application Ser. No. 387,784 filed Aug. 1, 1989 now U.S. Pat. No. 4,919,468, which is a continuation-in-part of Application Ser. No. 158,846 filed Feb. 22, 1988, abandoned.

BACKGROUND OF THE INVENTION

1. Field of the Invention

This invention relates to improvements to sun visors for passenger cars and other vehicles.

2. Description of the Prior Art

Current passenger cars and similar vehicles (vans, trucks, etc.) are equipped with a single sun visor on the driver side and another on the passenger side. Each visor is movable and can cover at any one time only the front windshield, or a front side window but not both.

Additional visors are introduced here for enhanced safety and comfort, especially in certain situations when it is desirable to simultaneously and independently cover critical locations of side windows and the front or back windshield.

The advantage here over prior art is the novelty of the design and the simplicity of operation.

SUMMARY OF THE INVENTION

This invention introduces hinge mounted and slidable sun visors each restricted to cover a side window, or cover a windshield of a vehicle. Rotatable visors of the prior art are invariably mounted at one or both ends of a side for reasons of stability. Here, stable arrangements are achieved by mounting a visor by a single hinge centrally located along a side of the visor.

BRIEF DESCRIPTION OF THE DRAWINGS

The following drawings illustrate examples of the basic shapes which are the subject of this invention.

DESCRIPTION OF THE PREFERRED EMBODIMENTS

The main objective of this invention is to make it possible to independently cover top parts of both a windshield and a side window whenever it is desirable to do.

Examples of the preferred embodiments of this invention are shown in FIGS. 1 to 7 discussed above.

Each visor 1 is to be attached above the front windshield or a side window by a single hinge centrally located along a side of the visor when the visor is in its stored position. The hinge is similar to common door hinges, butt hinges, pin hinges, joint hinges, offset blind hinge, etc. A hinge here refers to a structure on which a visor can swing, comprised of (a) a pin which acts in part as a pivot, and (b) two plates having cylindrical parts surrounding the pin which act as clamps holding onto the pin. The plates have holes for mounting to objects by appropriate means. The hinge should be tight enough to hold the visor 1 in any angle between the top of a vehicle and a lowered used position, yet the hinge should be sufficiently loose to allow rotation of the visor to any desirable position.

The motion of the visor 1 in the present case can also be automated as is done these days for doors. A preferred arrangement, shown in FIG. 2, is to extend the pin of a hinge and to connect it to a motor 3 in a manner to automate rotation of the pin and consequently automate rotation of the associated visor.

Figure 1:
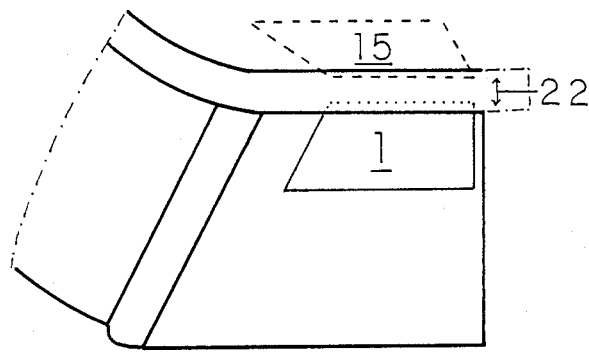
FIG. 1 is a perspective view of a side window and part of a windshield of a car showing a visor 1 in a lowered used position, and showing by dashed lines the stored raised position 15 of the visor at a top interior part of the car.
Figure 2:
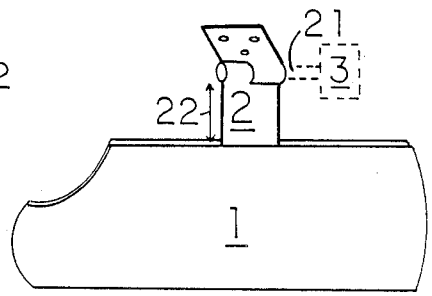
FIG. 2 is a perspective view of a visor 1 and its possible mounting by a joint hinge. The dashed lines indicate a possible extension of the pin of the hinge and a motor 3 to automate the rotation of the visor between its normal rest or stored position and a lowered used position.

FIG. 2 shows a visor 1 mounted by a joint hinge. Clearly other hinges can be used in place of a joint hinge. The visor in this figure is suitable as a secondary visor to be mounted behind typical visors available for the current generation of passenger cars. Note that the plates of the hinge need not be identical to each other. Numeral 22 indicates the distance between the edge of the visor when it is in a lowered position and the top of the interior part of the car.

Figure 3:
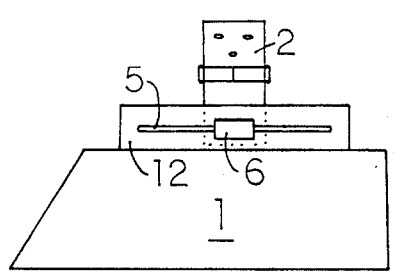
FIG. 3 shows a perspective view of a visor 1 having a visor plate 12 mounted to a hinge 2 by means of a fastener (brace or clamp) with a visible face 6.
Figure 4:
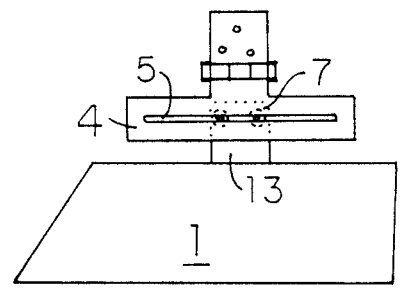
FIG. 4 shows a perspective view of a visor 1 having a visor plate 13 mounted to a modified hinge plate 4 by means of nuts 7 and bolts.

The visors of FIGs. 3 and 4 may be mounted by the hinge to a top interior part of a car adjacent to a window or a windshield. These figures show a perspective view of a visor 1 having as one of its integral parts a visor plate 12 or 13 having a plane face parallel to a face of the visor. The visor plate is mounted to a plate of the hinge by means of a fastener (brace or clamp) as in FIG. 3, or the nuts 7 and bolts as in FIG. 4. Ball bearings may be used between the visor plate and its associated hinge plate, the ball bearings are to be preferably mounted on the smaller of these two plates. This arrangement make it possible to easily slide the visor horizontally through a range controlled by the length of the slit 5 shown in FIGS. 3 and 4.

Figure 5:
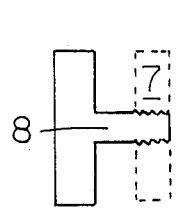
FIG. 5 shows a cross section of a bolt 8 and a nut 7 corresponding to the nut 7 of FIG. 4.
Figure 6:
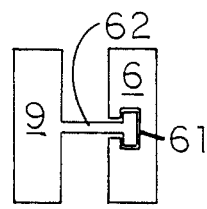
FIGS. 6 and 7 show vertical cross sections of possible designs of the fastener indicated in FIG. 3. Here, the cross section takes the form of a letter "H" with one part 9 or 91 in the form of a rotated letter "T" and with the bottom part of the stem 62 or 63 modified to have a suitable cross section which whould fit in a groove 61 in the second vertical part 6 of the H-shaped fastener.
Figure 7:
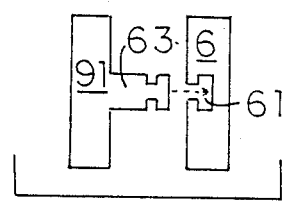

FIG. 5 shows a cross section of a bolt 8 and a nut 7 corresponding to the nut 7 of FIG. 4. FIGS. 6 and 7 show vertical cross sections of possible designs of the fastener indicated in FIG. 3. Here, the cross section takes the form of a letter "H" with one part 9 or 91 in the form of a rotated letter "T" and with the bottom part of the stem 62 or 63 modified to have a suitable cross section which whould fit in a groove 61 in the second vertical part 6 of the H-shaped fastener. The stem of the T part of the fastener referred to above would fit in a slit 5 in the visor plate 12 of FIG. 3; the plate of the visor and that of the hinge would be held between the vertical sides of the H-shaped fastener.

Clearly the fastener of FIG. 3 can be replaced by the nuts and bolts of FIG. 4 or vice versa. In FIG. 4, one plate of the hinge is modified and has a wide part and a wide slit 5 for mounting the visor plate (and thus for mounting the visor) and making it possible for the visor plate 13 and the visor 1 to slide horizontally. Also the arrangements in FIGS. 3 and 4 are equivalent.

Another arrangement of visors is to have a visor associated with each top side of a windshield, and to have strictly side visors, one associated with each side window. In the preferred embodiment, a visor for a windshield would be the same as in FIG. 2, and a visor for a side window would be the same a in FIGS. 3 to 7.

One main advantage of the choice of certain visors which are restricted to cover a windshield or a side window, but not both, is the fact that their admissible motion is not likely to interfere with the driver's or a front seat passenger's face.

While we have illustrated and described several embodiments of our invention, it will be understood that these are by way of illustration only and that various changes, extensions and modifications may be contemplated in this invention and within the scope of the following claims.

We claim:

1. A sun visor mounted by means of a hinge to the top part of an automobile; said hinge makes it possible to rotate said visor between a top stored position and a lowered used position;

said hinge is comprised of (a) a pin which acts in part as a pivot, and (b) two plates having plane faces and having cylindrical parts surrounding the pin;

said cylindrical parts of the plates surrounding the pin act as clamps and are (a) sufficiently loose around the pin to allow rotation of the visor with little tension, yet (b) sufficiently tight to hold the plates and visor in any position following partial rotations;

said visor has a visor plate along one of its sides; said visor plate is an integral part of said visor and has a plane face parallel to a face of said visor; said visor plate is mounted to a plate of the hinge; one of the said visor plate and said plate of the hinge has a slit therein in order for the visor plate and the visor to slide easily in a horizontal direction.

* * * * *